United States Patent
Dunki-Jacobs et al.

(10) Patent No.: US 7,982,776 B2
(45) Date of Patent: Jul. 19, 2011

(54) SBI MOTION ARTIFACT REMOVAL APPARATUS AND METHOD

(75) Inventors: Robert J. Dunki-Jacobs, Mason, OH (US); Michael P. Weir, Blanchester, OH (US)

(73) Assignee: Ethicon Endo-Surgery, Inc., Cincinnati, OH (US)

( * ) Notice: Subject to any disclaimer, the term of this patent is extended or adjusted under 35 U.S.C. 154(b) by 964 days.

(21) Appl. No.: 11/777,602

(22) Filed: Jul. 13, 2007

(65) Prior Publication Data

US 2009/0015695 A1    Jan. 15, 2009

(51) Int. Cl.
- H04N 5/228 (2006.01)
- H04N 5/217 (2006.01)
- H01J 5/16 (2006.01)
- A61B 1/06 (2006.01)
- A61B 6/00 (2006.01)

(52) U.S. Cl. .......... 348/208.99; 348/241; 250/234; 600/173; 600/476

(58) Field of Classification Search .......... 348/208.99, 348/241; 250/234; 600/173, 476
See application file for complete search history.

(56) References Cited

U.S. PATENT DOCUMENTS

| | | | |
|---|---|---|---|
| 3,758,199 A | 9/1973 | Thaxter | |
| 3,959,582 A | 5/1976 | Law et al. | |
| 4,082,635 A | 4/1978 | Fritz et al. | |
| 4,141,362 A | 2/1979 | Wurster | |
| 4,313,431 A | 2/1982 | Frank | |
| 4,379,039 A | 4/1983 | Fujimoto et al. | |
| 4,403,273 A | 9/1983 | Nishioka | |
| 4,409,477 A | 10/1983 | Carl | |
| 4,421,382 A | 12/1983 | Doi et al. | |
| 4,524,761 A | 6/1985 | Hattori et al. | |
| 4,527,552 A | 7/1985 | Hattori | |
| 4,573,465 A | 3/1986 | Sugiyama et al. | |
| 4,576,999 A | 3/1986 | Eckberg | |
| 4,597,380 A | 7/1986 | Raif et al. | |
| 4,643,967 A | 2/1987 | Bryant | |
| 4,676,231 A | 6/1987 | Hisazumi et al. | |
| 4,760,840 A | 8/1988 | Fournier, Jr. et al. | |
| 4,803,550 A | 2/1989 | Yabe et al. | |
| 4,872,458 A | 10/1989 | Kanehira et al. | |
| 4,902,083 A | 2/1990 | Wells | |
| 4,902,115 A | 2/1990 | Takahashi | |

(Continued)

FOREIGN PATENT DOCUMENTS

DE    3837248    5/1990

(Continued)

OTHER PUBLICATIONS

Invitation to Pay Additional Fees with Partial International Search Report, PCT/US2008/074275 (Jan. 16, 2009).

(Continued)

*Primary Examiner* — David L Ometz
*Assistant Examiner* — Quang V Le
(74) *Attorney, Agent, or Firm* — Victor C. Moreno

(57) ABSTRACT

A system, method and apparatus for eliminating image tearing effects and other visual artifacts perceived when scanning moving subject matter with a scanned beam imaging device. The system, method and apparatus uses a motion detection means in conjunction with an image processor to alter the native image to one without image tearing or other visual artifacts. The image processor monitors the motion detection means and reduces the image resolution or translates portions of the imaged subject matter in response to the detected motion.

26 Claims, 6 Drawing Sheets

U.S. PATENT DOCUMENTS

| | | |
|---|---|---|
| 4,934,773 A | 6/1990 | Becker |
| 4,938,205 A | 7/1990 | Nudelman |
| 5,003,300 A | 3/1991 | Wells |
| 5,023,905 A | 6/1991 | Wells et al. |
| 5,048,077 A | 9/1991 | Wells et al. |
| 5,074,860 A | 12/1991 | Gregory et al. |
| 5,078,150 A | 1/1992 | Hara et al. |
| 5,163,936 A | 11/1992 | Black et al. |
| 5,163,945 A | 11/1992 | Ortiz et al. |
| 5,172,685 A | 12/1992 | Nudelman |
| 5,192,288 A | 3/1993 | Thompson et al. |
| 5,200,819 A | 4/1993 | Nudelman et al. |
| 5,200,838 A | 4/1993 | Nudelman et al. |
| 5,207,670 A | 5/1993 | Sinofsky |
| 5,218,195 A | 6/1993 | Hakamata |
| 5,251,025 A | 10/1993 | Cooper et al. |
| 5,251,613 A | 10/1993 | Adair |
| 5,269,289 A | 12/1993 | Takehana et al. |
| 5,318,024 A | 6/1994 | Kittrell et al. |
| 5,334,991 A | 8/1994 | Wells et al. |
| 5,368,015 A | 11/1994 | Wilk |
| 5,370,643 A | 12/1994 | Krivoshlykov et al. |
| 5,387,197 A | 2/1995 | Smith et al. |
| 5,393,647 A | 2/1995 | Neukermans et al. |
| 5,436,655 A | 7/1995 | Hiyama et al. |
| 5,467,104 A | 11/1995 | Furness, III et al. |
| 5,488,862 A | 2/1996 | Neukermans et al. |
| 5,531,740 A | 7/1996 | Black |
| 5,545,211 A | 8/1996 | An et al. |
| 5,552,452 A | 9/1996 | Khadem et al. |
| 5,557,444 A | 9/1996 | Melville et al. |
| 5,590,660 A | 1/1997 | MacAulay et al. |
| 5,596,339 A | 1/1997 | Furness, III et al. |
| 5,608,451 A | 3/1997 | Konno et al. |
| 5,629,790 A | 5/1997 | Neukermans et al. |
| 5,648,618 A | 7/1997 | Neukermans et al. |
| 5,649,952 A | 7/1997 | Lam |
| 5,657,165 A | 8/1997 | Karpman et al. |
| 5,658,710 A | 8/1997 | Neukermans |
| 5,659,327 A | 8/1997 | Furness, III et al. |
| 5,694,237 A | 12/1997 | Melville |
| 5,701,132 A | 12/1997 | Kollin et al. |
| 5,713,891 A | 2/1998 | Poppas |
| 5,728,121 A | 3/1998 | Bimbo et al. |
| 5,735,792 A | 4/1998 | Vanden Hoek et al. |
| 5,742,419 A | 4/1998 | Dickensheets et al. |
| 5,742,421 A | 4/1998 | Wells et al. |
| 5,751,465 A | 5/1998 | Melville et al. |
| 5,768,461 A | 6/1998 | Svetkoff et al. |
| 5,797,944 A | 8/1998 | Nobles et al. |
| 5,817,061 A | 10/1998 | Goodwin et al. |
| 5,823,943 A | 10/1998 | Tomioka et al. |
| 5,827,176 A | 10/1998 | Tanaka et al. |
| 5,827,190 A | 10/1998 | Palcic et al. |
| 5,841,553 A | 11/1998 | Neukermans |
| 5,861,549 A | 1/1999 | Neukermans et al. |
| 5,867,297 A | 2/1999 | Kiang et al. |
| 5,895,866 A | 4/1999 | Neukermans et al. |
| 5,903,397 A | 5/1999 | Melville et al. |
| 5,907,425 A | 5/1999 | Dickensheets et al. |
| 5,913,591 A | 6/1999 | Melville |
| 5,947,930 A | 9/1999 | Schwemberger et al. |
| 5,969,465 A | 10/1999 | Neukermans et al. |
| 5,969,871 A | 10/1999 | Tidwell et al. |
| 5,982,528 A | 11/1999 | Melville |
| 5,982,555 A | 11/1999 | Melville et al. |
| 5,993,037 A | 11/1999 | Tomioka et al. |
| 5,995,264 A | 11/1999 | Melville |
| 6,007,208 A | 12/1999 | Dickensheets et al. |
| 6,008,781 A | 12/1999 | Furness, III et al. |
| 6,013,025 A | 1/2000 | Bonne et al. |
| 6,016,440 A | 1/2000 | Simon et al. |
| 6,017,356 A | 1/2000 | Frederick et al. |
| 6,017,603 A | 1/2000 | Tokuda et al. |
| 6,024,744 A | 2/2000 | Kese et al. |
| 6,043,799 A | 3/2000 | Tidwell |
| 6,044,705 A | 4/2000 | Neukermans et al. |
| 6,046,720 A | 4/2000 | Melville et al. |
| 6,049,407 A | 4/2000 | Melville |
| 6,056,721 A | 5/2000 | Shulze |
| 6,057,952 A | 5/2000 | Kubo et al. |
| 6,059,720 A | 5/2000 | Furusawa et al. |
| 6,061,163 A | 5/2000 | Melville |
| 6,064,779 A | 5/2000 | Neukermans et al. |
| 6,069,725 A | 5/2000 | Melville |
| 6,086,528 A | 7/2000 | Adair |
| 6,086,531 A | 7/2000 | Tomioka et al. |
| 6,088,145 A | 7/2000 | Dickensheets et al. |
| 6,097,353 A | 8/2000 | Melville et al. |
| 6,122,394 A | 9/2000 | Neukermans et al. |
| 6,139,175 A | 10/2000 | Tomioka et al. |
| 6,140,979 A | 10/2000 | Gerhard et al. |
| 6,151,167 A | 11/2000 | Melville |
| 6,154,305 A | 11/2000 | Dickensheets et al. |
| 6,154,321 A | 11/2000 | Melville et al. |
| 6,157,352 A | 12/2000 | Kollin et al. |
| 6,166,841 A | 12/2000 | Melville |
| 6,172,789 B1 | 1/2001 | Kino et al. |
| 6,178,346 B1 | 1/2001 | Amundson et al. |
| 6,179,776 B1 | 1/2001 | Adams et al. |
| 6,191,761 B1 | 2/2001 | Melville et al. |
| 6,192,267 B1 | 2/2001 | Scherninski et al. |
| 6,200,595 B1 | 3/2001 | Motoyashiki et al. |
| 6,204,829 B1 | 3/2001 | Tidwell |
| 6,204,832 B1 | 3/2001 | Melville et al. |
| 6,207,392 B1 | 3/2001 | Weiss et al. |
| 6,210,401 B1 | 4/2001 | Lai |
| 6,220,711 B1 | 4/2001 | Melville |
| 6,221,068 B1 | 4/2001 | Fried et al. |
| 6,229,139 B1 | 5/2001 | Neukermans et al. |
| 6,235,017 B1 | 5/2001 | Jegorov et al. |
| 6,243,186 B1 | 6/2001 | Melville |
| 6,245,590 B1 | 6/2001 | Wine et al. |
| 6,256,131 B1 | 7/2001 | Wine et al. |
| 6,257,727 B1 | 7/2001 | Melville |
| 6,272,907 B1 | 8/2001 | Neukermans et al. |
| 6,276,798 B1 | 8/2001 | Gil et al. |
| 6,281,862 B1 | 8/2001 | Tidwell et al. |
| 6,284,185 B1 | 9/2001 | Tokuda et al. |
| 6,285,489 B1 | 9/2001 | Helsel et al. |
| 6,285,505 B1 | 9/2001 | Melville et al. |
| 6,288,816 B1 | 9/2001 | Melville et al. |
| 6,292,287 B1 | 9/2001 | Fujinoki |
| 6,293,911 B1 | 9/2001 | Imaizumi et al. |
| 6,294,239 B1 | 9/2001 | Tokuda et al. |
| 6,294,775 B1 | 9/2001 | Seibel et al. |
| 6,317,103 B1 | 11/2001 | Furness, III et al. |
| 6,323,037 B1 | 11/2001 | Lauto et al. |
| 6,324,007 B1 | 11/2001 | Melville |
| 6,327,493 B1 | 12/2001 | Ozawa et al. |
| 6,331,909 B1 | 12/2001 | Dunfield |
| 6,333,110 B1 | 12/2001 | Barbera-Guillem |
| 6,338,641 B2 | 1/2002 | Nicholls |
| 6,352,344 B2 | 3/2002 | Tidwell |
| 6,353,183 B1 | 3/2002 | Ott et al. |
| 6,362,912 B1 | 3/2002 | Lewis et al. |
| 6,364,829 B1 | 4/2002 | Fulghum |
| 6,369,928 B1 | 4/2002 | Mandella et al. |
| 6,369,953 B2 | 4/2002 | Melville et al. |
| 6,369,954 B1 | 4/2002 | Berge et al. |
| 6,370,406 B1 | 4/2002 | Wach et al. |
| 6,370,422 B1 | 4/2002 | Richards-Kortum et al. |
| 6,373,995 B1 | 4/2002 | Moore |
| 6,384,406 B1 | 5/2002 | Wine et al. |
| 6,388,641 B2 | 5/2002 | Tidwell et al. |
| 6,392,220 B1 | 5/2002 | Slater et al. |
| 6,396,461 B1 | 5/2002 | Lewis et al. |
| 6,414,779 B1 | 7/2002 | Mandella et al. |
| 6,417,502 B1 | 7/2002 | Stoner et al. |
| 6,423,956 B1 | 7/2002 | Mandella et al. |
| 6,425,900 B1 | 7/2002 | Knodel et al. |
| 6,426,013 B1 | 7/2002 | Neukermans et al. |
| 6,433,907 B1 | 8/2002 | Lippert et al. |
| 6,435,637 B1 | 8/2002 | Lyman |
| 6,441,356 B1 | 8/2002 | Mandella et al. |
| 6,445,362 B1 | 9/2002 | Tegreene |
| 6,447,524 B1 | 9/2002 | Knodel et al. |

| Patent No. | Date | Inventor(s) |
|---|---|---|
| 6,462,770 B1 | 10/2002 | Cline et al. |
| 6,464,363 B1 | 10/2002 | Nishioka et al. |
| 6,467,345 B1 | 10/2002 | Neukermans et al. |
| 6,470,124 B1 | 10/2002 | Le Gargasson et al. |
| 6,477,403 B1 | 11/2002 | Eguchi et al. |
| 6,478,809 B1 | 11/2002 | Brotz |
| 6,485,413 B1 | 11/2002 | Boppart et al. |
| 6,492,962 B2 | 12/2002 | Melville et al. |
| 6,494,578 B1 | 12/2002 | Plummer et al. |
| 6,503,196 B1 | 1/2003 | Kehr et al. |
| 6,510,338 B1 | 1/2003 | Irion et al. |
| 6,512,622 B2 | 1/2003 | Wine et al. |
| 6,513,939 B1 | 2/2003 | Fettig et al. |
| 6,515,278 B2 | 2/2003 | Wine et al. |
| 6,515,781 B2 | 2/2003 | Lewis et al. |
| 6,520,972 B2 | 2/2003 | Peters |
| 6,522,444 B2 | 2/2003 | Mandella et al. |
| 6,525,310 B2 | 2/2003 | Dunfield |
| 6,527,708 B1 | 3/2003 | Nakamura et al. |
| 6,529,770 B1 | 3/2003 | Grimblatov |
| 6,530,698 B1 | 3/2003 | Kuhara et al. |
| 6,535,183 B2 | 3/2003 | Melville et al. |
| 6,535,325 B2 | 3/2003 | Helsel et al. |
| 6,537,211 B1 | 3/2003 | Wang et al. |
| 6,538,625 B2 | 3/2003 | Tidwell et al. |
| 6,545,260 B1 | 4/2003 | Katashiro et al. |
| 6,560,028 B2 | 5/2003 | Melville et al. |
| 6,563,105 B2 | 5/2003 | Seibel et al. |
| 6,563,106 B1 | 5/2003 | Bowers et al. |
| 6,572,606 B2 | 6/2003 | Kliewer et al. |
| 6,583,117 B2 | 6/2003 | Owen et al. |
| 6,583,772 B1 | 6/2003 | Lewis et al. |
| 6,585,642 B2 | 7/2003 | Christopher |
| 6,603,552 B1 | 8/2003 | Cline et al. |
| 6,608,297 B2 | 8/2003 | Neukermans et al. |
| 6,639,570 B2 | 10/2003 | Furness, III et al. |
| 6,639,719 B2 | 10/2003 | Tegreene et al. |
| 6,650,877 B1 | 11/2003 | Tarbouriech et al. |
| 6,653,621 B2 | 11/2003 | Wine et al. |
| 6,654,158 B2 | 11/2003 | Helsel et al. |
| 6,661,393 B2 | 12/2003 | Tegreene et al. |
| 6,674,993 B1 | 1/2004 | Tarbouriech |
| 6,685,804 B1 | 2/2004 | Ikeda et al. |
| 6,687,034 B2 | 2/2004 | Wine et al. |
| 6,689,056 B1 | 2/2004 | Kilcoyne et al. |
| 6,699,170 B1 | 3/2004 | Crocker et al. |
| 6,700,552 B2 | 3/2004 | Kollin et al. |
| 6,714,331 B2 | 3/2004 | Lewis et al. |
| 6,734,835 B2 | 5/2004 | Tidwell et al. |
| 6,736,511 B2 | 5/2004 | Plummer et al. |
| 6,741,884 B1 | 5/2004 | Freeman et al. |
| 6,749,346 B1 | 6/2004 | Dickensheets et al. |
| 6,755,536 B2 | 6/2004 | Tegreene et al. |
| 6,762,867 B2 | 7/2004 | Lippert et al. |
| 6,768,588 B2 | 7/2004 | Urey |
| 6,771,001 B2 | 8/2004 | Mao et al. |
| 6,782,748 B2 | 8/2004 | Weber et al. |
| 6,786,382 B1 | 9/2004 | Hoffman |
| 6,795,221 B1 | 9/2004 | Urey |
| 6,802,809 B2 | 10/2004 | Okada |
| 6,803,561 B2 | 10/2004 | Dunfield |
| 6,821,245 B2 | 11/2004 | Cline et al. |
| 6,845,190 B1 | 1/2005 | Smithwick et al. |
| 6,856,436 B2 | 2/2005 | Brukilacchio et al. |
| 6,856,712 B2 | 2/2005 | Fauver et al. |
| 6,879,428 B2 | 4/2005 | Massieu |
| 6,888,552 B2 | 5/2005 | Debevec et al. |
| 6,894,823 B2 | 5/2005 | Taylor et al. |
| 6,899,675 B2 | 5/2005 | Cline et al. |
| 6,902,527 B1 | 6/2005 | Doguchi et al. |
| 6,905,057 B2 | 6/2005 | Swayze et al. |
| 6,939,364 B1 | 9/2005 | Soltz et al. |
| 6,957,898 B2 | 10/2005 | Yu |
| 6,967,757 B1 | 11/2005 | Allen et al. |
| 6,974,472 B2 | 12/2005 | Hong et al. |
| 6,975,898 B2 | 12/2005 | Seibel |
| 6,976,994 B2 | 12/2005 | Ballou et al. |
| 6,978,921 B2 | 12/2005 | Shelton, IV et al. |
| 6,985,271 B2 | 1/2006 | Yazdi et al. |
| 6,991,602 B2 | 1/2006 | Nakazawa et al. |
| 7,005,195 B2 | 2/2006 | Cheng et al. |
| 7,009,634 B2 | 3/2006 | Iddan et al. |
| 7,013,730 B2 | 3/2006 | Malametz |
| 7,015,956 B2 | 3/2006 | Luo et al. |
| 7,018,401 B1 | 3/2006 | Hyodoh et al. |
| 7,023,402 B2 | 4/2006 | Lewis et al. |
| 7,025,777 B2 | 4/2006 | Moore |
| 7,033,348 B2 | 4/2006 | Alfano et al. |
| 7,035,777 B2 | 4/2006 | Araki et al. |
| 7,061,450 B2 | 6/2006 | Bright et al. |
| 7,065,301 B2 | 6/2006 | Shastri et al. |
| 7,066,879 B2 | 6/2006 | Fowler et al. |
| 7,071,594 B1 | 7/2006 | Yan et al. |
| 7,071,931 B2 | 7/2006 | Tegreene et al. |
| 7,078,378 B1 | 7/2006 | Owen et al. |
| 7,108,656 B2 | 9/2006 | Fujikawa et al. |
| 7,112,302 B2 | 9/2006 | Yoshimi et al. |
| 7,126,903 B2 | 10/2006 | Feenstra et al. |
| 7,189,961 B2 | 3/2007 | Johnston et al. |
| 7,190,329 B2 | 3/2007 | Lewis et al. |
| 7,232,071 B2 | 6/2007 | Lewis et al. |
| 7,271,383 B2 | 9/2007 | Chee |
| 7,391,013 B2 | 6/2008 | Johnston et al. |
| 7,448,995 B2 * | 11/2008 | Wiklof et al. .................. 600/173 |
| 7,504,948 B2 * | 3/2009 | Wulff et al. ................. 340/572.1 |
| 2001/0055462 A1 | 12/2001 | Seibel |
| 2002/0015724 A1 | 2/2002 | Yang et al. |
| 2002/0024495 A1 | 2/2002 | Lippert et al. |
| 2002/0050956 A1 | 5/2002 | Gerhard et al. |
| 2002/0075284 A1 | 6/2002 | Rabb, III |
| 2002/0088925 A1 | 7/2002 | Nestorovic et al. |
| 2002/0115922 A1 | 8/2002 | Waner et al. |
| 2002/0141026 A1 | 10/2002 | Wiklof et al. |
| 2002/0158814 A1 | 10/2002 | Bright et al. |
| 2002/0163484 A1 | 11/2002 | Furness, III et al. |
| 2002/0167462 A1 | 11/2002 | Lewis et al. |
| 2002/0171776 A1 | 11/2002 | Tegreene et al. |
| 2002/0171937 A1 | 11/2002 | Tegreene et al. |
| 2003/0016187 A1 | 1/2003 | Melville et al. |
| 2003/0030753 A1 | 2/2003 | Kondo et al. |
| 2003/0032143 A1 | 2/2003 | Neff et al. |
| 2003/0034709 A1 | 2/2003 | Jerman |
| 2003/0058190 A1 | 3/2003 | Lewis et al. |
| 2003/0086172 A1 | 5/2003 | Urey |
| 2003/0092995 A1 | 5/2003 | Thompson |
| 2003/0130562 A1 | 7/2003 | Barbato et al. |
| 2003/0142934 A1 | 7/2003 | Pan et al. |
| 2003/0159447 A1 | 8/2003 | Sergio et al. |
| 2003/0214460 A1 | 11/2003 | Kovacs |
| 2003/0216729 A1 | 11/2003 | Marchitto et al. |
| 2004/0004585 A1 | 1/2004 | Brown et al. |
| 2004/0008782 A1 * | 1/2004 | Boyce et al. ............. 375/240.16 |
| 2004/0057103 A1 | 3/2004 | Bernstein |
| 2004/0075624 A1 | 4/2004 | Tegreene et al. |
| 2004/0076390 A1 | 4/2004 | Dong Yang et al. |
| 2004/0085261 A1 | 5/2004 | Lewis et al. |
| 2004/0085617 A1 | 5/2004 | Helsel et al. |
| 2004/0087844 A1 | 5/2004 | Yen |
| 2004/0101822 A1 | 5/2004 | Wiesner et al. |
| 2004/0113059 A1 | 6/2004 | Kawano et al. |
| 2004/0118821 A1 | 6/2004 | Han et al. |
| 2004/0119004 A1 | 6/2004 | Wine et al. |
| 2004/0122328 A1 | 6/2004 | Wang et al. |
| 2004/0133786 A1 | 7/2004 | Tarbouriech |
| 2004/0151466 A1 | 8/2004 | Crossman-Bosworth et al. |
| 2004/0155186 A1 | 8/2004 | Nestorovic et al. |
| 2004/0155834 A1 | 8/2004 | Wit et al. |
| 2004/0179254 A1 | 9/2004 | Lewis et al. |
| 2004/0196518 A1 | 10/2004 | Wine et al. |
| 2004/0223202 A1 | 11/2004 | Lippert et al. |
| 2004/0225222 A1 | 11/2004 | Zeng et al. |
| 2004/0236371 A1 | 11/2004 | McNally-Heintzelman et al. |
| 2004/0240866 A1 | 12/2004 | Ramsbottom |
| 2004/0252377 A1 | 12/2004 | Urey |
| 2004/0254474 A1 | 12/2004 | Seibel et al. |
| 2005/0010787 A1 | 1/2005 | Tarbouriech |
| 2005/0014995 A1 | 1/2005 | Amundson et al. |
| 2005/0020877 A1 | 1/2005 | Ishihara et al. |

| | | | |
|---|---|---|---|
| 2005/0020926 A1 | 1/2005 | Wiklof et al. | |
| 2005/0023356 A1 | 2/2005 | Wiklof et al. | |
| 2005/0030305 A1 | 2/2005 | Brown et al. | |
| 2005/0038322 A1 | 2/2005 | Banik | |
| 2005/0116038 A1 | 6/2005 | Lewis et al. | |
| 2005/0162762 A1 | 7/2005 | Novak | |
| 2005/0187441 A1 | 8/2005 | Kawasaki et al. | |
| 2005/0203343 A1 | 9/2005 | Kang et al. | |
| 2005/0222801 A1* | 10/2005 | Wulff et al. | 702/141 |
| 2005/0240147 A1 | 10/2005 | Makower et al. | |
| 2006/0010985 A1 | 1/2006 | Schneider | |
| 2006/0084867 A1 | 4/2006 | Tremblay et al. | |
| 2006/0164330 A1 | 7/2006 | Bright et al. | |
| 2006/0183246 A1 | 8/2006 | Wiesner et al. | |
| 2006/0195014 A1 | 8/2006 | Seibel et al. | |
| 2006/0238774 A1 | 10/2006 | Lindner et al. | |
| 2006/0245971 A1 | 11/2006 | Burns et al. | |
| 2006/0284790 A1 | 12/2006 | Tegreene et al. | |
| 2007/0038119 A1 | 2/2007 | Chen et al. | |
| 2007/0046778 A1 | 3/2007 | Ishihara et al. | |
| 2007/0135770 A1 | 6/2007 | Hunt et al. | |
| 2007/0156021 A1 | 7/2007 | Morse et al. | |
| 2007/0161876 A1 | 7/2007 | Bambot et al. | |
| 2007/0162093 A1 | 7/2007 | Porter et al. | |
| 2007/0167681 A1 | 7/2007 | Gill et al. | |
| 2007/0173707 A1 | 7/2007 | Mitra | |
| 2007/0179366 A1 | 8/2007 | Pewzner et al. | |
| 2007/0197874 A1 | 8/2007 | Ishihara | |
| 2007/0197875 A1 | 8/2007 | Osaka | |
| 2007/0203413 A1 | 8/2007 | Frangioni | |
| 2007/0213588 A1 | 9/2007 | Morishita et al. | |
| 2007/0213618 A1 | 9/2007 | Li et al. | |
| 2007/0225695 A1 | 9/2007 | Mayer et al. | |
| 2007/0238930 A1 | 10/2007 | Wiklof et al. | |
| 2007/0244365 A1 | 10/2007 | Wiklof | |
| 2007/0260121 A1 | 11/2007 | Bakos et al. | |
| 2007/0260273 A1 | 11/2007 | Cropper et al. | |
| 2007/0272841 A1* | 11/2007 | Wiklof | 250/234 |
| 2008/0007722 A1* | 1/2008 | Golab et al. | 356/139.09 |
| 2008/0058629 A1 | 3/2008 | Seibel et al. | |

FOREIGN PATENT DOCUMENTS

| | | |
|---|---|---|
| EP | 1139141 | 10/2001 |
| EP | 1716802 | 11/2006 |
| EP | 1747751 | 1/2007 |
| EP | 1797813 | 6/2007 |
| JP | 2007-244590 | 9/2007 |
| JP | 2007-244680 | 9/2007 |
| WO | WO 98/13720 | 4/1998 |
| WO | WO 99/18456 | 4/1999 |
| WO | 99/58930 | 11/1999 |
| WO | 00/13210 | 3/2000 |
| WO | 01/10322 | 2/2001 |
| WO | 01/60274 | 8/2001 |
| WO | 02/062239 | 8/2002 |
| WO | WO 03/069380 | 8/2003 |
| WO | 03/088643 | 10/2003 |
| WO | 03/098918 | 11/2003 |
| WO | 03/101287 | 11/2003 |
| WO | 2006/020605 | 2/2006 |
| WO | WO 2006/049787 | 5/2006 |
| WO | WO 2006/055733 | 5/2006 |
| WO | 2007/041542 | 4/2007 |
| WO | 2007/070831 | 6/2007 |
| WO | WO 2007/067163 | 6/2007 |
| WO | WO 2007/084915 | 7/2007 |

OTHER PUBLICATIONS

Invitation to Pay Additional Fees with Partial International Search Report, PCT/US2008/074273 (Dec. 30, 2008).
PCT, International Search Report, PCT/US2008/066552 (Oct. 23, 2008).
Kiang, M-H et al., "Surface-Micromachined Electrostatic-Comb Driven Scanning Micromirrors for Barcode Scanners" (date of first publication unknown).
Lewis, J.R. et al., "Scanned beam medical imager," MOEMS Display and Imaging Systems II, Proceedings of SPIE vol. 5348, pp. 40-51 (2004).
James, R. et al., "Update on MEMS-based Scanned Beam Imager" (date of first publication unknown).
Wiklof, C., "Display technology spawns laser camera," Laser Focus World (Dec. 2004).
"Press Information—Phillips' Fluid Lenses Bring Things into Focus," http://www.newscenter.philips.com (Mar. 3, 2004).
Lettice, J., "The $5 'no moving parts' fluid zoom lens—twice," The Register (Mar. 15, 2004).
"Volcano Products—IVUS Imaging Visions® PV018," http://www.volcanotherapeutics.com (date of first publication unknown).
Barhoum, E.S. et al., "Optical modeling of an ultrathin scanning fiber endoscope, a preliminary study of confocal versus non-confocal detection," Optics Express, vol. 13, No. 19, pp. 7548-7652 (Sep. 19, 2005).
"Crystalplex Technology—PlxBead™ Superior Qualities," http:www.crystalplex.com (date of first publication unknown).
"Microvision [illuminating information] Products/Overview, Corporate Overview Presentation 2006" (2006).
"Holographic Beam Combiner for Ladar, Printer, Fiber Optics, and Cancer Treatment," by Digital Optics Technologies, Inc., http://www.mdatechnology.net (date of first publication unknown).
Brown, D.M., Abstract from SPIE Digital Library for "High-power laser diode beam combiner," Optical Engineering, vol. 42, Issue 11 (2003).
Literature entitled "All fiber beam combiner from Point Source" (Oct. 13, 2006).
"Custom Polarzing Cube Beamsplitters," from GlobalSpec The Engineering Search Engine, http://www.globalspec.com (date of first publication unknown).
Literature entitled "Dallas Semiconductor MAXIM—Visible-Laser Driver has Digitally Controlled Power Modulation," by Maxim Integrated Products, http://www.maxim-ic.com (Jul. 1, 2001).
"Scan Mode Strategies for SCUBA-2" (May 25, 2005).
Seifert, M. et al., "High Power Diode Laser Beam Scanning in Multi-Kilowatt Range," Proceedings of the 23rd International Congress on Applications of Lasers and Electro-Optics (2004).
Jutzi, B. et al., "Sub-Pixel Edge Localization Based on Laser Waveform Analysis," ISPRS WG III/3, III/4, V/3 Workshop "Laser scanning 2005," Enschede, the Netherlands (Sep. 12-14, 2005).
"Bladeless Trocars," by Johnson & Johnson, http://jnjgateway.com (date of first publication unknown).
Yeh, R. et al., "Microelectromechanical Components for Articulated Microrobots" (date of first publication unknown).
Xu, Q. et al., "Micrometre-scale silicon electro-optic modulator," Nature, vol. 435, pp. 325-327 (May 19, 2005).
Park, H. et al., "Development of Double-Sided Silicon Strip Position Sensor," 2005 IEEE Nuclear Science Symposium Conference Record, pp. 781-785 (2005).
Hammond, S.W., "Architecture and Operation of a Systolic Sparse Matrix Engine," Proceedings of the 3rd SIAM Conference on Parallel Processing for Scientific Computing, pp. 419-423 (1987).
Ra, H. et al., "Biomedical Optics & Medical Imaging—Microtechnology enables endoscopic confocal microscopy," SPIE (http://spie.org) (2007).
International Search Report issued regarding International Application No. PCT/US2007/078868 (Mar. 28, 2008).
PCT, International Search Report, PCT/US2008/056589 (Jul. 30, 2008).
PCT, International Search Report, PCT/U52008/059231 (Jul. 4, 2008).
PCT, International Search Report, PCT/US2007/087923 (May 21, 2008).
PCT, International Search Report, PCT/US2008/056596 (Jun. 23, 2008).
PCT, International Search Report, PCT/US2008/059235 (Jul. 14, 2008).
PCT, International Search Report, PCT/US2007/087930 (Jul. 3, 2008).
PCT, International Search Report, PCT/US2008/051274 (Jul. 18, 2008).

* cited by examiner

Full Scan Region (Field of View)

SBI MOTION ARTIFACT REMOVAL APPARATUS AND METHOD

TECHNICAL FIELD

The present invention relates generally to systems, devices, and methods for eliminating image tearing effects and other visual artifacts perceived during imaging when an SBI or Scanned Beam Imaging device moves appreciably relative to the subject matter being imaged.

BACKGROUND OF THE INVENTION

Imaging devices can have different native resolutions and frame rates. Focal Plane Array (FPA) devices typically use Charge Coupled Device (CCD) or similar technologies to capture video images. CCD imagers typically capture 30 full frames per second (fps) using a technique called interlacing, whereby first the odd numbered horizontal lines of the frame are imaged and then the even numbered lines are imaged. Each half frame is resolved all at once at 60 fps, and when displayed on a screen each half frame is blended to some degree by the human eye with the next half frame to make the full screen image. The 60 fps refresh rate is generally beyond the human perception threshold, so the video appears continuous and uninterrupted. Any significant movement of the subject matter faster than the actual instantaneous exposure rate of the CCD imager merely causes image structure to fall into multiple pixels in the CCD imager during image capturing. Most CCD images can therefore accommodate a sizeable amount of movement of the subject matter being imaged before viewing it becomes visually uncomfortable for the user. Moving subject matter simply appears blurry and snaps back into focus once the movement ceases. Users of SBI devices expect the same or a better quality of SBI images than those of CCD imagers.

SBI devices, however, use a higher resolution technology that is less forgiving in regards to movement of the subject matter. Instead of acquiring the entire frame at once, the area to be imaged is rapidly scanned point-by-point by an incident beam of light, the returned light being picked up by sensors and translated into a native data stream representing a series of scanned points and associated returned light intensity values. Unlike CCD imaging, where all or half of the pixels are imaged simultaneously, each scanned point in an SBI image is temporally displaced forward in time from the previously scanned point. If the SBI device and scene experience relative movement between the time the first data point is sampled and the last data point is sampled, the subject matter as a whole will not be imaged evenly. Because each data point is sampled very quickly in full resolution, there is relatively no blurring of the image to mask movement artifacts as one has with CCD imaging.

Additionally, the scanning pattern for an SBI image is usually a bi-sinusoidal or some other scanning pattern as known in the art; see, for example see the scanning beam imaging endoscope in U.S. Patent Application US 2005/0020926 A1 to Wikloff et al. Due to the temporal differences in each scanned point, a complex relationship exists between the instantaneous direction and velocity of the SBI device's scanning beam and direction and velocity of the moving subject matter resulting in image artifacts not typically seen in CCD imaging.

When the subject matter moves appreciably relative to the scanning rate of the SBI device, the scanning beam may no longer image the subject matter evenly. At low speeds, the subject matter may appear to become somewhat distorted, and these distortions can appear visually as texture artifacts where some features become thicker or thinner based on the interaction between the scanning pattern and the direction of motion of the subject matter. Some fine features can become suddenly more easily discernable while fine features in other parts of the image can disappear altogether as the scanned lines lump together. At higher rates of subject matter motion, some parts of the subject matter may be scanned multiple times, while others not scanned at all. Depending on the relative motions of the subject matter and scanning beam, this aliasing effect can present itself for example as multiple simultaneous overlapping images, serrations of various forms, or as a tearing of parts or all of the image. To the user, these effects can be visually uncomfortable and distracting.

What is needed is a system, device, and method for eliminating image artifacts when an SBI device moves appreciably relative to the subject matter being imaged.

SUMMARY OF THE INVENTION

The present invention meets the above and other needs. One embodiment of the invention works by selectively reducing resolution when motion is detected. Another embodiment of the invention works by tracking the movement of the SBI device and reconstructing the translated data points, shifting them to compensate for the differences in movement between data samples. Another embodiment works by a combination of resolution reduction and shifted image reconstructing when motion is detected.

As the user moves the SBI device, the user's need to recognize small structures in the subject matter generally decreases. For example, when the user is moving the SBI device rapidly, the user is typically looking for the general area to begin examining. It is well known that the human visual system cannot resolve high resolution in a moving scene. Therefore, the user only requires resolution sufficient to see larger structures to help guide the user to the area desired to be imaged. Once the user slows or stops panning the SBI device the user is typically desiring to look at a specific area in the subject matter and will desire an increase in resolution.

Recognizing that users of SBI devices do not always need to see the subject matter at the highest possible resolution at all times, one embodiment of the system, device and method couples the resolution of the SBI device inversely to the motion of the SBI device and subject matter being imaged. When the SBI device is not moving relative to the subject matter, the maximum resolution is presented for optimal viewing by the user. When the SBI device moves appreciably relative to the subject matter, the resolution of the image is decreased, thereby reducing the occurrence of tearing effects and other visual artifacts that would otherwise be perceived by the user. Altering the displayed resolution is accomplished using a motion artifact removal image processor.

Small rapid movements can continue to occur even with the steadiest of hands. This can occur during periods when high resolution is desired by the user and therefore an alternative strategy is employed. This embodiment of the invention tracks the motion of the SBI device and associates one or more vectors with each data sample. The motion artifact removal image processor then reconstructs a corrected image from the SBI image stream by using one or more of the vectors to translate each data sample to the proper position relative to the other data samples as if there had been no motion. Reconstruction of the image presents the user a corrected image with reduced motion artifacts and tearing while maintaining the native high resolution of the SBI imager as much as possible.

The motion artifact removal image processor has a means for ascertaining the relative motion of the SBI device relative to the subject matter being imaged. Where the scene is relatively fixed in space, as is true for many applications, the means can include one or more accelerometers attached to the SBI device or the motion can be detected algorithmically by analyzing the image data for indications of movement, for example by looking for changes from image frame to image frame, or scan line to scan line.

BRIEF DESCRIPTION OF THE DRAWINGS

The accompanying figures depict multiple embodiments of the motion artifact removal image processor and associated method. A brief description of each figure is provided below. Elements with the same reference numbers in each figure indicate identical or functionally similar elements. Additionally, as a convenience, the left-most digit(s) of a reference number identifies the drawings in which the reference number first appears.

DETAILED DESCRIPTION

Figure 1A:
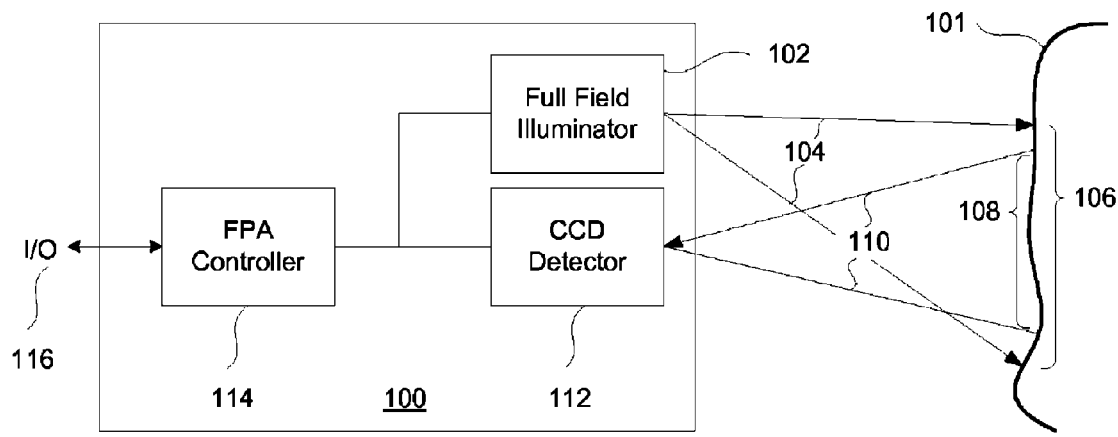
FIG. 1a is a schematic diagram of a prior art imaging system using a Focal Plane Array (FPA) imaging device.
Figure 1B:
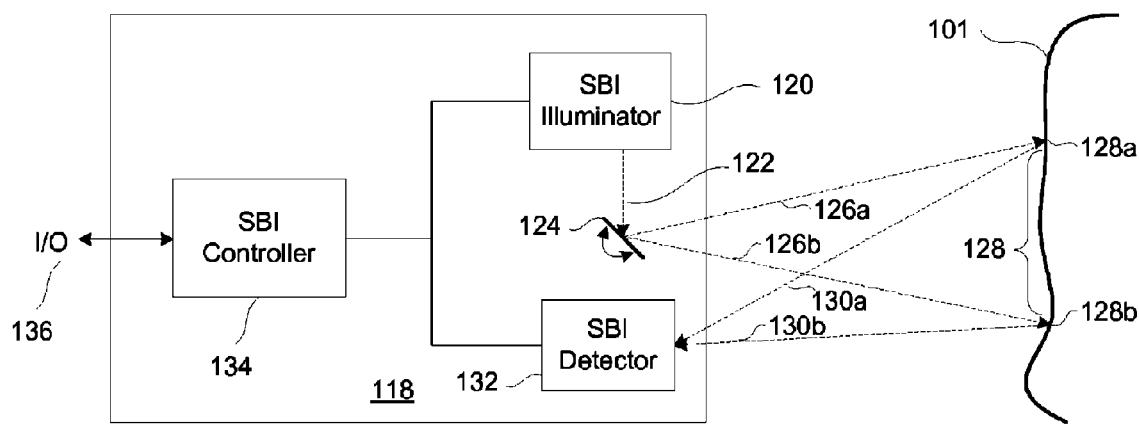
FIG. 1b is a schematic diagram of a prior art imaging system using an SBI device.
Figure 2A:
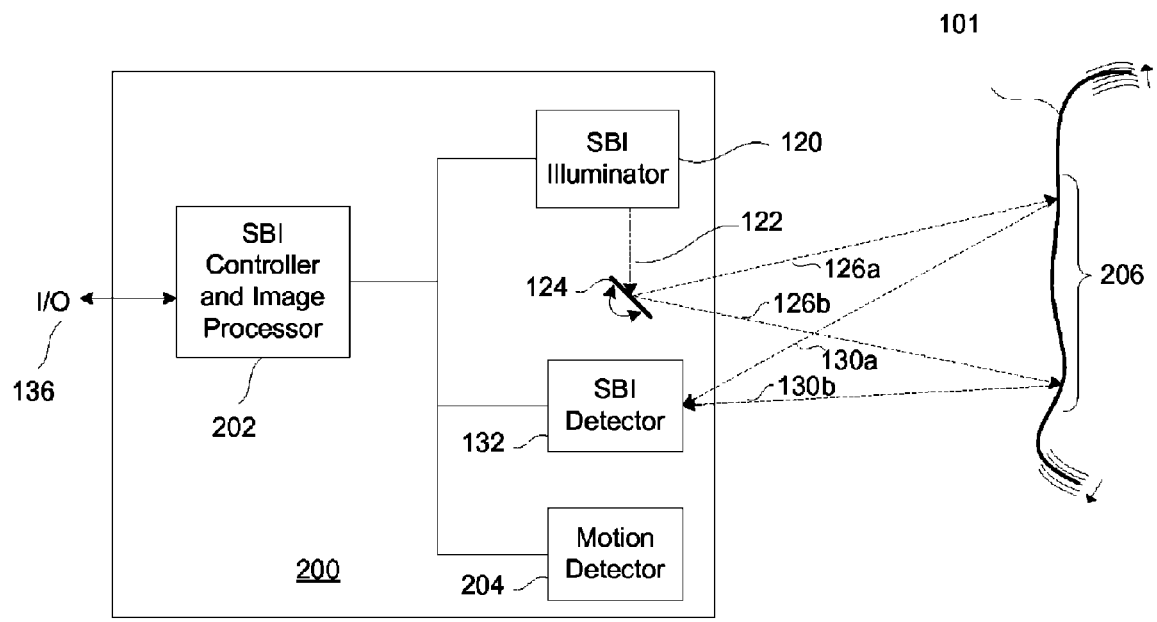
FIG. 2a is a schematic diagram of an embodiment of the imaging system where an SBI device has a motion detector and implements a motion artifact removal image process to remove artifacts caused by relative motion between an SBI device and a target.
Figure 2B:
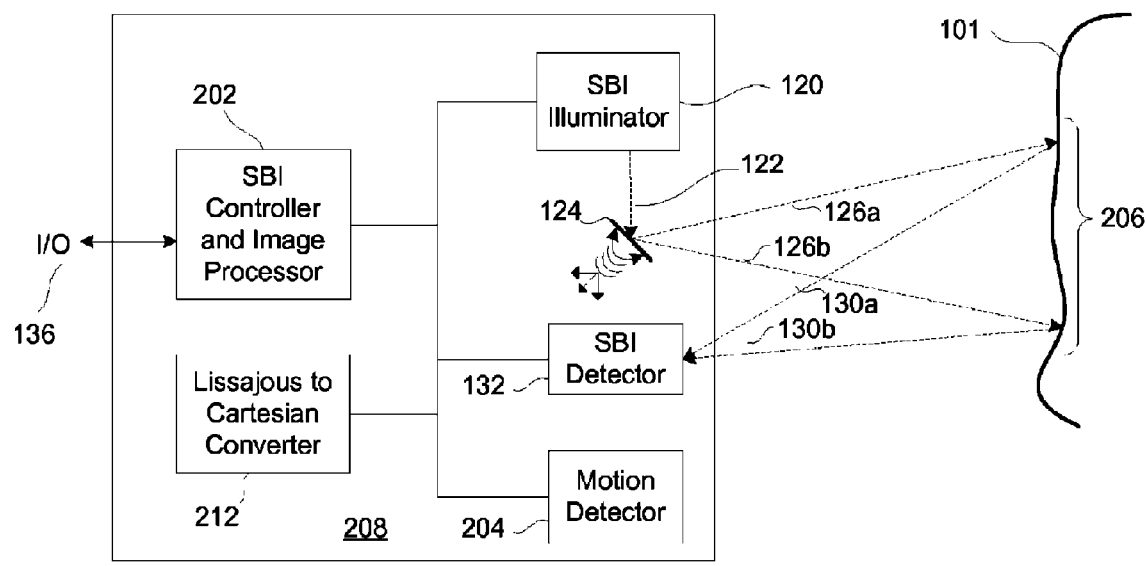
FIG. 2b is a schematic diagram of an embodiment of the imaging system where an SBI device has a motion detector, implements a motion artifact removal image process to remove artifacts caused by movement during imaging, and can convert between Lissajous and Cartesian spaces.
Figure 3A:
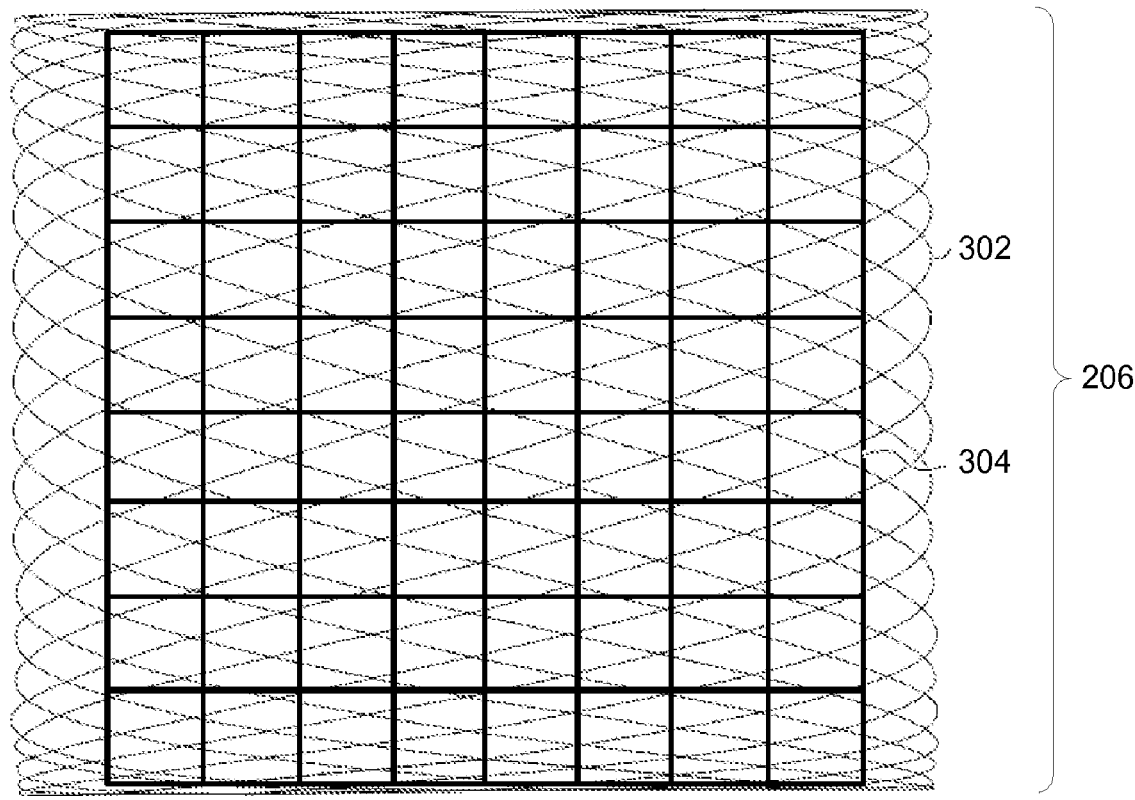
FIG. 3a is an illustration of an SBI scanning process.
Figure 3B:
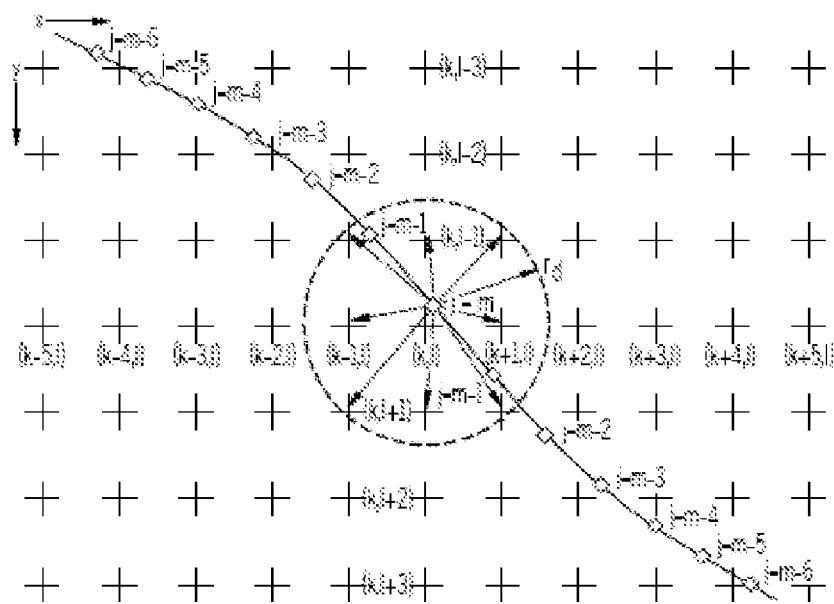
FIG. 3b is an illustration used to facilitate understanding the process of translating data points to new scan lines or new coordinates.

FIGS. 1a and 1b detail the prior art imaging systems. FIGS. 2a and 2b describe exemplary embodiments of the present invention. FIGS. 3a and 3b illustrate the scanning and data sample translation processes of an SBI device and system. FIGS. 4a-c, and 5 show examples of the artifact removal processes.

Prior Art FPA Imaging System

Referring now to the schematic diagram of a prior art FPA imaging system 100 depicted in FIG. 1a, the FPA controller 114 controls an I/O port 116, a full field illuminator 102, and a CCD detector 112. The full field illuminator 102 illuminates a target illumination area 106 of a target subject matter 101 with a broad beam of illumination 104. The CCD detector 112 spatially resolves returned illumination 110 from the target imaging area 108 and converts it to an electrical signal for eventual display.

In a typical prior art FPA imaging system 100, a full field illuminator 102 illuminates a target illumination area 106 of a target subject matter 101, for example a patient, with a beam of illumination 104. The illuminated area 106 is typically as large as or slightly larger than the target imaging area 108. The CCD detector 112 captures the returned illumination 110 of the target imaging area 108 and converts the returned illumination 110 into pixel data values that can be read by the FPA controller 114. The FPA controller 114 provides a processed video signal via the I/O port 116. The video signal from the FPA imaging system 100 can be any kind of analog signal including a composite signal, an S-Video signal, or a Component RGB signal, the Component RGB in either interlaced or progressive scan being common. Alternatively the video signal can be in a digital format using a USB, IEEE 1394, DVI, HDMI or other high speed serial digital signal.

Prior Art SBI System

U.S. Published Application 2005/0020926 discloses an SBI device which is shown in FIG. 1b herein. This imager can be used in applications in which cameras have been used in the past. In particular it can be used in medical devices such as video endoscopes, laparoscopes, etc.

FIG. 1b shows a block diagram of one example of a scanned beam imager system 118. An SBI illuminator 120 creates a first beam of light 122. A scanner 124 deflects the first beam of light across an SBI field-of-view (FOV) 128 to produce a second scanned beam of light 126, shown in two positions 126a and 126b. The scanned beam of light 126 is substantially narrower than the broad beam of illumination 104 of an FPA-based system, and sequentially illuminates spots in the SBI FOV 128, shown as positions 128a and 128b, corresponding to beam positions 126a and 126b, respectively. While the beam 126 illuminates the spots in the SBI FOV 128, the illuminating light beam 126 is reflected, absorbed, scattered, refracted, or otherwise affected by the object or material in the FOV 128 to produce scattered light energy. A portion of the scattered light energy 130, shown emanating from spot positions 126a and 126b as scattered energy rays 130a and 130b, respectively, travels to one or more SBI detectors 132 that receive the light. For consistency this light will be referred to as "returned" light. The detectors produce electrical signals corresponding to the amount of light energy received. Image information is provided as an array of data, where each location in the array corresponds to a position in the scan pattern. The electrical signals are connected to an SBI controller 134 that builds up a digital image and transmits it for further processing, decoding, archiving, printing, display, or other treatment or use via SBI I/O interface 136.

Illuminator 120 may include multiple emitters such as, for instance, light emitting diodes (LEDs), lasers, thermal sources, arc sources, fluorescent sources, gas discharge sources, or other types of illuminators. In some embodiments, illuminator 120 comprises a red laser diode having a wavelength of approximately 635 to 670 nanometers (nm). In another embodiment, illuminator 120 comprises three lasers: a red diode laser, a green diode-pumped solid state (DPSS) laser, and a blue DPSS laser at approximately 635 nm, 532 nm, and 473 nm, respectively. Illuminator 120 may include, in the case of multiple emitters, beam combining optics to combine some or all of the emitters into a single beam. Illuminator 120 may also include beam-shaping optics such as one or more collimating lenses and/or apertures. Additionally, while the wavelengths described in the previous embodiments have been in the optically visible range, other wavelengths may be within the scope of the invention. The illuminators 120 and detectors 132 may operate at different wavelengths, as for example to utilize fluorescence. Illuminator 120, while illustrated as a single beam, may comprise a plurality of beams converging on a single scanner 124 or onto separate scanners 124.

One example of these scanners 124 employs a MEMS scanner capable of deflection about two orthogonal scan axes, in which both scan axes are driven at a frequency near their natural mechanical resonant frequency of the MEMS device upon which it is constructed. In another example, one axis is operated near resonance while the other is operated substantially off resonance. For completeness it is also noted that scanner 124 are also known that employ two reflectors, one of which oscillates sinusoidally and the other of which simply scans linearly. SBI devices are advantageous because they are often able to provide higher resolution and a broader scan area. An SBI device is able to provide pixel by pixel interrogation with a high range of data capture.

SBI System with Motion Artifact Removal Image Processor

Referring now to the schematic diagram of an embodiment of an SBI system with motion artifact removal image processor 200 depicted in FIG. 2a, the system is similar to the scanned beam imager system 118 of FIG. 1b with the addition of an SBI controller with a motion artifact removal image processor 202 that is in communication with a motion detector 204. Because the target subject matter 101, or patient, may move during imaging as illustrated for a single dimension in FIG. 2a, the scene content defined by the field of view or FOV 206 can also change over time.

Referring now to the schematic diagram of an embodiment of an SBI system with a motion artifact removal image processor and Lissajous to Cartesian converter 208 depicted in FIG. 2b, the system is similar to SBI system with a motion artifact removal image processor 200 depicted in FIG. 2a with the addition of an Lissajous to Cartesian converter 212 that is in communication with the SBI controller with motion artifact removal image processor 202.

As data points in the FOV 206 are scanned by the SBI systems 200, 208, an SBI formatted digital sample data stream is delivered from the SBI detector 132. In one embodiment, the data points are scanned and sampled every 20 ns and delivered in an RGBF format where R, G, and B are 12 bit values of Red, Green, and Blue respectively, and F is a separate 12 bit value for Fluorescence. In another embodiment, the subject matter could be sampled and the data may represent infrared, ultraviolet, or grayscale brightness. In another embodiment the subject matter could be sampled at a non-uniform rate, in higher or lower resolutions.

Due to the way SBI systems 200, 208 operate, if the scanner 124 moves appreciably relative to the target subject matter 101 being imaged, characteristic image artifacts can appear. These artifacts, when significant, can result in uncomfortable viewing for the user using the SBI systems 200, 208. The motion detector 204 detects if the scanner 124 is moving appreciably relative to the target subject matter 101 being imaged the SBI controller with a motion artifact removal image processor 202 applies algorithms to the image data in order to reduce or eliminate the occurrences of artifacts. The SBI controller with a motion artifact removal image processor 202 can detect relative motion algorithmically or through the use of a motion detector 204 sensor in the SBI systems 200, 208. Sensing motion computationally has the advantage that the SBI controller with a motion artifact removal image processor 202 will detect any relative motion, whether it is the target subject matter 101 or the scanner 124 that is moving. Algorithmic motion sensing also requires no physical sensors in the SBI systems 200, 208. Sensing motion using a motion detector 204 sensor requires less computational processing, but requires physical placement of one or more motion detector 204 sensors in the SBI systems 200, 208.

In one embodiment, the motion detector 204 sensors comprise a set MEMS accelerometers such as the Analog Devices ADXL330 3-axis linear acceleration sensor. Using accelerometers allows the SBI systems 200, 208 to compute translation of the SBI systems 200, 208 in all three axis of motion, as well as rotation, allowing detailed information about the precise movement of the SBI systems 200, 208 during scanning. In alternate embodiments, the motion detector 204 is any suitable device capable of determining the instantaneous position and orientation of the scanner 124 relative to the target subject matter 101, including but not limited to accelerometers and associated software, mechanical positioning systems, infrared or electro-optical positioning systems, and RF-type positioning systems.

In one embodiment, the scanner 124 is in a separate device from the SBI controller with motion artifact removal image processor 202. Because the relative motion that matters is the relative motion between the scanner 124 and the target subject matter 101, future references may accordingly refer to the relative motion as between the scanner 124 and the target subject matter 101. However, because different embodiments can have the SBI controller with motion artifact removal image processor 202 incorporated into the same device or devices as the scanner 124, such references should also be read to include the relative motion between the entire SBI systems 200, 208 and target subject matter 101 as well.

In another embodiment, motion is approximated algorithmically by using the occurrence of natural edges in the target subject matter 101 to detect motion. Unlike an FPA device which takes a snapshot image of the subject matter, the SBI device scans the target subject matter 101 in a sequential fashion, creating slight sampling time differences between when the lines or points are scanned. The SBI systems 200, 208 interleave or interlace the scan paths by a factor of approximately 32:1 (compared to 2:1 for NTSC interleaved video), although alternative embodiments with different interleave ratios are contemplated. Along each of the 32 scan paths that make up a FOV 206, the position of edges in the target subject matter 101 should be relatively contiguous and in the same place. When there is little relative movement between the scanner 124 and the target subject matter 101 the location of edges along the fast scan axis of an edge in each of the scan paths should line up from scan path to scan path. By mapping the motion of corresponding edges from scan path to scan path (among each or any of the 32 scan paths in the image), one can estimate the relative motion between the scanner 124 and the target subject matter 101. In another embodiment, the SBI controller with motion artifact removal image processor 202 determines which data points in previous or successive frames should be next to each other and estimates the amount of movement of the subject matter from the spatial shifts of data points that occur during scanning. For example SBI controller with motion artifact removal image processor 202 can analyze where edges in the target subject matter 101 occur during one frame and detect the extent of the motion by comparing the movement of those edges in subsequent data points of another frame.

Although there are many complicated methods of detection motion known in the art, one way to quickly and algorithmically detect motion in an image is to examine a portion of a frame for high frequency content using a Fourier transform. A Fourier transform is one method of sensing relative motion of an SBI systems 200, 208 and is similar in some respects to the method used to detect the focus of an FPA imaging system 100 as is known in the art. Fourier transforms reveal the spectral content of data. Images having many sharp edges or sample-to-sample transitions yield large high frequency results, and smooth continuous data yields comparatively less high frequency results. When properly focused, an FPA imaging system 100 generally presents sharp images with objects in the target subject matter 101 having clearly delineated edges. However, when out of focus the images will tend to blur any distinct edges in the target subject matter 101. In an FPA imaging system 100 performing a Fourier transform on a portion of an image having sharp edges yields a proportionally larger amount of high frequency data versus a Fourier transform on a portion having less distinct or blurry edges. Also, in an FPA imaging system 100, a sudden decrease in high frequency data from the Fourier transform of a portion of an image indicates possible blurring caused by an increase in motion, whereas a returning increase in high frequency results indicates a sharpening of the image cause by a cessation of motion.

In another embodiment, the SBI controller with motion artifact removal image processor 202 performs a Fourier transform on data comprised of a data point in a selected scan line and neighboring data points in adjacent scan lines. Any movement of the SBI device or target subject matter 101 can cause discernable spatial shifts or jump discontinuities of the target subject matter 101 from scanned line to scanned line that results in image tearing artifacts and the appearance of artificial edges in the image because of the times differences between scans of the target subject matter 101. The Fourier transform is generally performed using data points from neighboring data points in adjacent scan lines that are generally orthogonal to the direction of scanning, but any direction other than the direction of scanning will work to varying degrees. The greater the movement between the scanner 124 and the target subject matter 101, generally the greater the number of artificial edges that will be created during scanning caused by the shifting of where the target subject matter 101 is scanned. A greater number of artificial edges will yield a proportionally larger amount of high frequency results when a Fourier transform is applied to the data than a non-moving smooth continuous image without tearing and artificial edges. A vector describing the movement can be approximated by performing Fourier transforms on portions of the video data and analyzing the changes in the resulting distribution of frequencies indicated by the Fourier transform.

In another embodiment, the SBI system with a motion artifact removal image processor and Lissajous to Cartesian converter 208 first rasterizes the SBI imaged data in a Lissajous to Cartesian converter 212 into a Cartesian-oriented frame having dimensions of x by y, where x and y are chosen to be large enough to provide sufficient spectral information, before performing Fourier analysis on the rasterized frame. In another embodiment the Lissajous to Cartesian converter 212 is a process running on the SBI controller with motion artifact removal image processor 202. While the use of the Fourier transform is described, it will be clear that other transforms of similar nature, typically relating space or time and frequency, may be employed as well. Such transforms include discrete cosine transforms, fast Fourier transforms, Walsh transforms, wavelet transforms, etc.

An alternate embodiment of the SBI system with a motion artifact removal image processor and Lissajous to Cartesian converter 208 converts the SBI formatted digital sample data stream into a format compatible with a commercial display device (not shown) and outputs it via the I/O port 136, although it is contemplated that this functionality could be implemented in a separate unit in another embodiment of the invention. Both high and low resolutions and refresh rates are contemplated. In one embodiment, the display device may require a progressive scan 720 HDMI (ITU-R BT.601) with a 60 fps refresh rate signal. In another embodiment, the display device may require an SVGA VESA-compatible signal using at least 800×600 pixel resolution and 72 fps refresh rate, for example the Dynamic Display's MD1518-101 commercially available medical grade display. In another embodiment, the display device is a heads up display worn by the physician that accepts an SBI formatted digital sample data stream. Other suitable displays as would be known by one having ordinary skill in the art could also be used.

Lissajous Scanning Patterns and Lissajous to Cartesian Mapping

Referring now to FIG. 3a, an example FOV 206 of the SBI systems 200, 208 with both a Lissajous pattern 302 and a corresponding Cartesian space 304 is illustrated. Although not to scale, FIG. 3b illustrates how the mapping of SBI data points into a Cartesian space 304 can be performed. Because each SBI data point does not cleanly map in one and only one Cartesian space 304 data point, it may be desirable to map each SBI data point into one or more Cartesian pixels. The following discussion describes how to map from Lissajous scan lines to Cartesian coordinates and then from Cartesian coordinates back to Lissajous scan lines.

The scanner 124 employs an oscillating reflector with two orthogonal axis of rotation (labeled x and y) that operate in a resonant mode. The rate of oscillation is typically higher in one axis than the other. When properly excited, the scanner 124 causes a beam 122 of light reflected from its surface to trace a Lissajous pattern 302. The coordinates of the beam are approximated by $$x(t)=A \sin(w_f t+\phi_f)$$

$$y(t)=B \cos(w_s t+\phi_s).$$

where A and B are amplitudes, $\omega_f$ and $\phi_s$, $\phi_f$ and $\phi_s$ the fast and slow scan frequencies and phase offsets respectively. We refer to motion of this sort as a precessing, bisinusoidal scan.

Based on the phase relationship of the slow (s) and fast (f) axis motion, the basic Lissajous pattern can precess. The number of slow axis cycles required to precess the pattern to an initial spatial point, is called the interleave factor.

The Lissajous pattern is spatially repeated after a set number of oscillations on the slow axis (interleave factor). Once a reference point on the complete set of Lissajous patterns is identified, one can view the constant sample time, digital data stream captured at each optical detector as a vector of constant length, the Scanned Data Vector ($SDV_i$). The number of samples in the vector (N) is equal to the interleave factor times the period of the slow axis oscillation divided by the sample interval ($t_s$).

$$SDV_i(j\Delta t) = [s(i, j)]_{j=0}^{N-1}$$

If there are multiple optical detectors sampled coincidently, then the scanner assembly data stream can be viewed as a matrix, the Scanned Data Matrix (SDM), that has a row count equal to the number of sampled detectors (M) and a column count equal to the number of samples in each SDV (N). In a system having three color plus fluorescence channels, $$SDM = \begin{bmatrix} SDV_R \\ SDV_G \\ SDV_B \\ SSDV_V \end{bmatrix}$$

The pixel data matrix (PDM) is a two-dimensional matrix with row and column indices that represent the display space. For example, there may be 600 rows (Y) and 800 columns (X) and each point in the data set may be a triple representing red (R), green (G), and blue (B) display intensities.

$$PDM = \begin{bmatrix} (r_{0,0}, g_{0,0}, b_{0,0}) & \cdots & (r_{0,799}, r_{0,799}, b_{0,799}) \\ \vdots & & \vdots \\ (r_{599,0}, g_{599,0}, b_{599,0}) & & (r_{799,599}, g_{799,599}, b_{799,599}) \end{bmatrix}$$

In order to conveniently describe matrix operations, it may be useful to define a view of the matrix, PDM, that is a vector of length XY called PDV. The transformation between the two is not a matrix operation, but rather a reordering where the rows of PDM are constructed of successive blocks of PDV. Note that it is essential that the same reordering be used when accessing the PDV and the transformation matrix, T to be described next.

One exemplary method for transforming between Lissajous and Cartesian spaces involves multiplication by a matrix T or its inverse. The process for constructing this matrix is given in a later section. Matrix T is an N×XY matrix where N is the number of samples in the SD V; X is the number of horizontal pixels in the display space; and Y is the number of vertical pixels in the display space.

Converting from the Lissajous space SDM to the Cartesian space PDM potentially requires mapping SBI data points into multiple Cartesian pixels. Referring to FIG. 3b, the scan trajectory (solid line) is shown overlaying pixel data (crosses). The index into the data samples is j and pixels have indices (k,l), corresponding to discrete values of conventional Cartesian coordinates (x,y): not matrix indices (row, column). The origin of the pixel data coordinates is in the upper left hand corner. Data from a particular data sample will be distributed into pixels falling into a region of radius $r_d$ centered on the sample.

The solid line represents a portion of a specific trajectory of the dual resonant scanned beam through the scene. The diamonds indicate samples along that trajectory. The sample index (j) increases from the top left to bottom right in this depiction. The trajectory of the beam (with increasing sample index) can be in any direction through a subset of the scene. Note that the samples at the top left and bottom right are closer together than the samples in the center of the figure. This difference is shown to reinforce the implications of a constant data-sampling rate applied to resonant scanned beams. The particular sample index on the beam, m, will be utilized in subsequent discussions.

Conversion from Lissajous to Cartesian Data space can be represented as a matrix multiplication, followed by a data reordering

[SDV][T]=[PDV]

where the pixel data vector PDV is then reordered to yield the pixel data matrix PDM. If the number of samples in the SDV vector is N and the size of the Cartesian space is X by Y, the transformation matrix, T, is of dimension N by (X*Y).

The following process can be used to populate the T matrix. Through precise knowledge of the path of the scanned beam (that knowledge is assumed to be inherent in the scanner drive and positioning system) it is possible to identify the pixel data point closest to the sample, m, at $t=m\Delta t_s$ from the start of the frame. Denote that pixel with the indices (k,l). Next, construct a circle in Cartesian space of radius, $r_d$, over which the data from sample, m, is going to be distributed. For each pixel (k+s,l+t), where s and t are integers that describe points in Cartesian space located within the circle constructed above centered within the circle (a) compute the length (in Cartesian space), l, of the vector from the Cartesian space location of the SBI sample, m, to the center of the pixel space data pixel, (k+s,l+t) and (b) calculate a weighting value, w, that is proportional to the length, of the vector. Many functions can be used. In one embodiment it is a function decreasing monotonically with distance, such as, for example:

$$w = e^{-F\frac{s}{r_d}}$$

where:
w is the weighting factor,
s is the length of the vector from the SBI data point to the pixel of interest
F is a controllable constant that sets how fast the effects of the SBI data falls off as the value of 1 increases.
$r_d$ is the radius of the circle over which the data from the SBI sample is being distributed.

Record the value of w into the transformation matrix T at the x,y location of the subject pixel. The location in the matrix will be at row m and column j*N+x. It should be recognized that this method creates a sparse matrix, T. To improve computational efficiency, one may optionally use various methods to create a banded matrix amenable to hardware acceleration or optimized software algorithms, which is described by Hammond S, Dunki-Jacobs R, Hardy R, Topka T. "Architecture and Operation of a Systolic Sparse Matrix Engine", Proceedings of the Third SIAM Conference on Parallel Processing for Scientific Computing, 1987, (419-423), the details of which are hereby incorporated by reference as if fully set forth herein.

Similarly, one can convert from a particular data set, such as an image, in Cartesian space to a sample vector, m, by reordering the data into consistent form (that is, a vector of conformable size) and then solving the matrix equation:

[SDV]=[PDV]T$^{-1}$ where T is constructed as shown above. The above equation yields the multi-bit (analog) scan beam vector, SDV, which would result from a multi-bit (analog) Cartesian space matrix, PDM. Note that, in general, T is not square and the creation of the pseudoinverse matrix T$^{-1}$ can be computationally challenging, but can be accomplished as is known in the art. Distribution of multi-bit Cartesian space data to a multi-bit drive (continuously varying modulation) of the scan beam in Lissajous space does require construction of the inverse of the T matrix.

Device modeling predicts SBI devices will have a wider dynamic range than FPA devices as device size is reduced. It is possible to utilize this advantage to provide a greater number of pixels than a similarly-sized FPA device while matching the latter's dynamic range. In general, there will not be a one-to-one mapping for each SBI data point to each Cartesian pixel. To use a term common in the art, the conversion process from SBI space to Cartesian space would therefore be "lossy". To decrease loss, especially for image enhancement and storage of raw data purposes, the Lissajous to Cartesian converter 212 can internally use a much larger Cartesian frame with greater dynamic range than would be output to a monitor or received from an FPA or SBI device, and simply downsample and reduce the dynamic range appropriate to the monitor or storage device prior to outputting a video signal. Such a frame would reduce the loss in conversion between SBI and Cartesian spaces. It should be noted therefore, that this disclosure contemplates embodiments where the image processor is adapted to use an internal pixel frame that is both equal to, less than, or greater than that of an SBI or FPA pixel-oriented imaging device.

Although the above description and accompanying FIG. 3b is especially applicable to converting from Lissajous to Cartesian spaces, it is also applicable to Lissajous to Lissajous data mapping. One of ordinary skill in the art can see that weighting function described for FIG. 3b would also be applicable to mapping of data from one Lissajous SBI scan line to other Lissajous SBI scan lines without having to first convert to Cartesian spaces. Such a weighting function can be used when translating data points in the reconstruction method of motion artifact removal described later in the application.

Motion Artifacts with SBI Devices

Figure 4A:
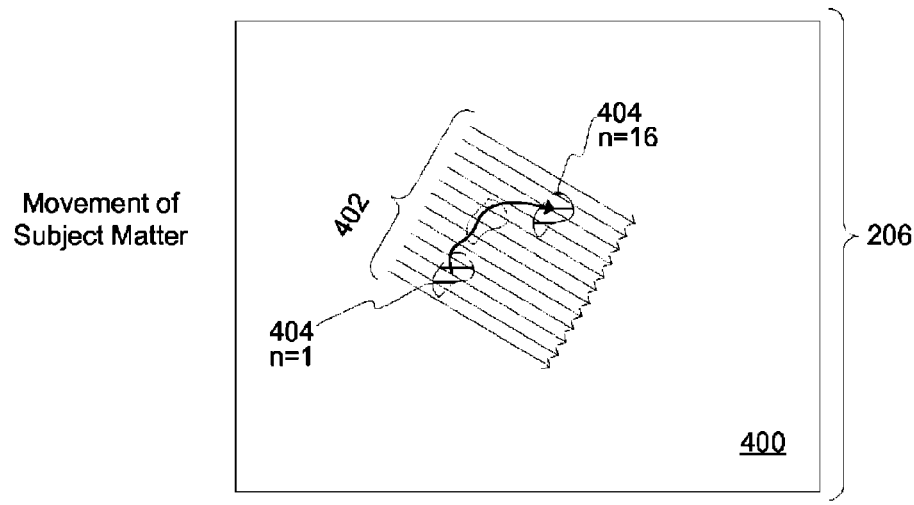
FIGS. 4a-4c are exemplary illustrations of one embodiment of the motion artifact removal algorithm where resolution is reduced when motion is detected.

Referring to FIG. 4a, an SBI system 200, 208, scans a field of view 206. The scanner 124 scans using a precessing bisinusoidal or Lissajous pattern for each scanned line 402 before returning close to, but slightly ahead of or behind its original starting point. As an example, after a scanning 15 lines, the cumulative effect of the offsets have caused the scanner 124 to be scanning completely different portions of the field of view 206. For ease of explanation, only a small region of a small subset of scanned lines 402 are illustrated. Depending on the resolution of the SBI device, and the characteristics of the precessing scanning algorithm, there could be tens or even hundreds of scans before the scanned line 402 has precessed a sufficient number of times to return to its original starting point, thereby completely scanning the entire field of view 206. The current embodiment of the invention uses 32 scan lines, however for clarity of exposition only 16 scan lines are illustrated.

Unlike an FPA device that takes a snapshot of the subject matter thereby imaging every data point concurrently (or in the case of a 2:1 interlaced image, half the data points at a time), an SBI device resolves each data point consecutively, one at a time. The cumulative effect of using a precessing scanning method to resolve an entire image means that each scan line n will be resolved at n times $\Delta t$ after the first scan n=1, where $\Delta t$ is the time required to individually resolve each data point for the entire scanned line 402. The effect, as shown, is that by the time the scanner 124 has scanned several lines, the subject matter 404 being scanned may have moved substantially. The effect of moving subject matter 404 on the image presented to the user is that the subject matter can have artifacts as can be inferred by noting that the subject matter 404 would not have been scanned by scan lines 402 n=13-15 had those scan lines 402 been scanned contemporaneously with the scanning of scan line 402 n=1. But by being scanned later in time, pieces of the moving subject matter 404 will be scanned multiple times due to the interaction between the precessing of the scanner 124 and the movement of the subject matter 404.

Motion Artifact Removal by Reducing Resolution

In one embodiment, the method of eliminating motion artifacts is to reduce resolution when the detected motion is deemed large enough to cause visible artifacts. SBI controller with motion artifact removal image processor 202 detects motion either algorithmically or from the motion detector 204, the later scan lines 402 are discarded while the earlier scan lines 402 are repeated to create a complete set of downsampled scan lines 412. A simple example will be explained first, and a more complicated example is illustrated later in FIGS. 4b and 4c. As a simple example and without referring to any figures yet, to drop the resolution by half, only the first half of a set of scan lines 402 are utilized. The first scan line 402 for n=1 becomes the scan line for downsampled scan lines 412 n=1 and n=2. The second scan line 402 for n=2 becomes the scan line for downsampled scan lines 412 n=3 and n=4, etc. until the entire set is complete, and thereafter dropping all remaining scan lines 402. This same process can be extended to drop the resolution to ⅓rd, ¼th, ⅕th etc. Using interpolation, convolving and any number of other techniques as would be known in the art, the rough edges in the reconstituted downsampled image can be blended to create a more appealing image.

Figure 4B:
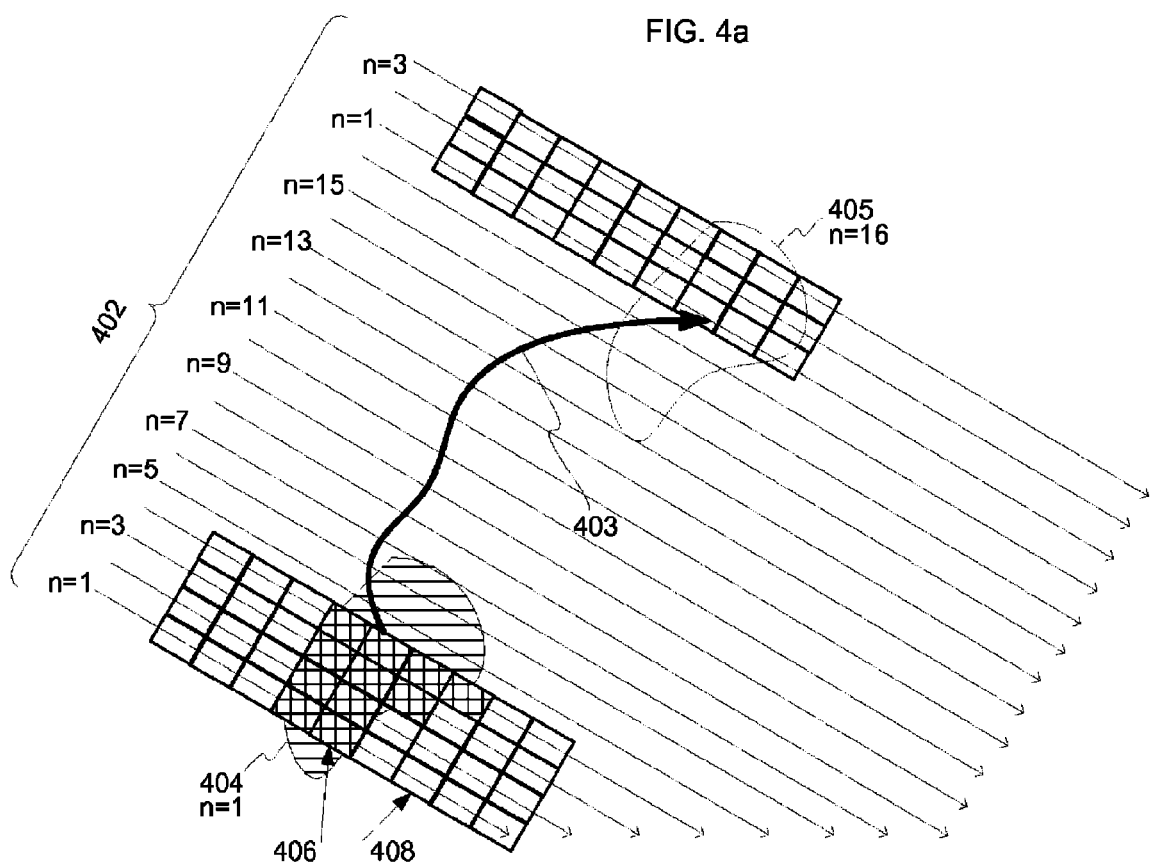
Figure 4C:
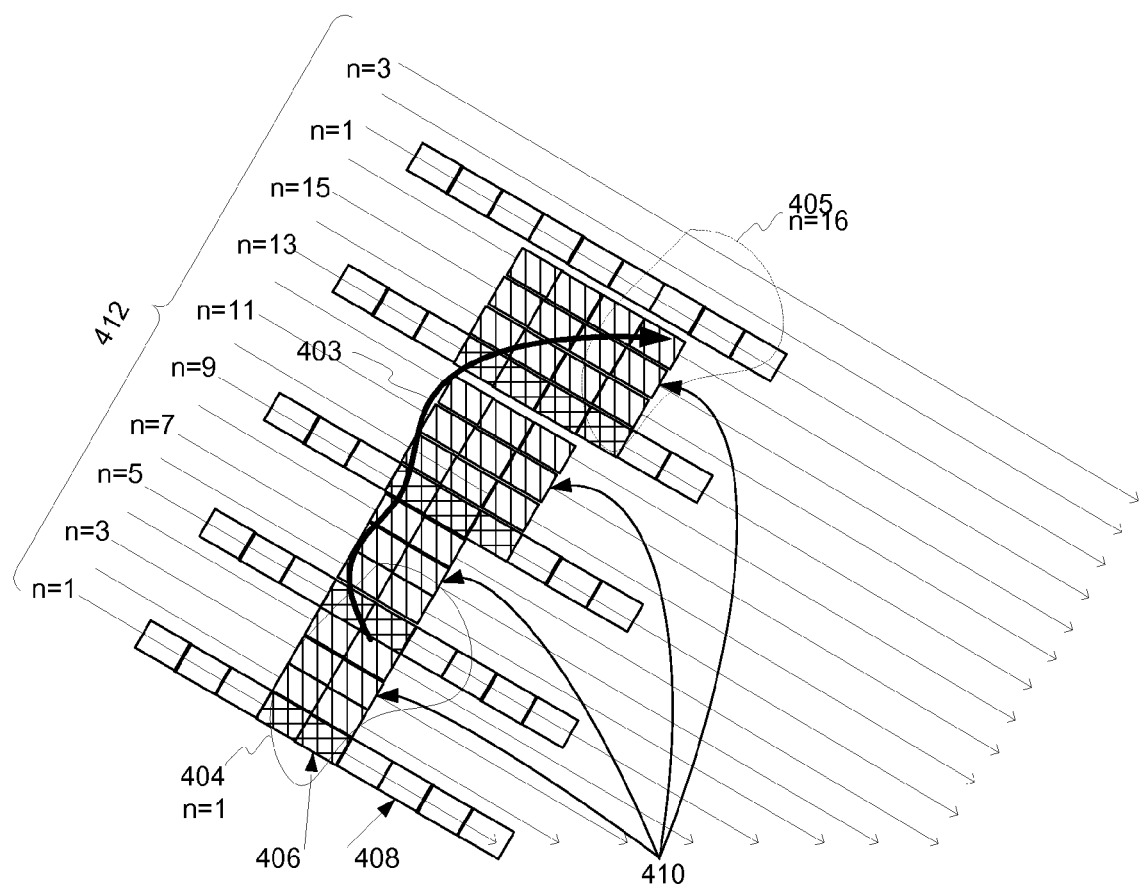

This process is illustrated in FIGS. 4b and 4c for dropping the resolution to ¼th the original resolution. The figures show subject matter 404 that is moving during sampling, as illustrated by its curvilinear path 403. Referring to FIG. 4b, only the first four scan lines 402 out of sixteen scans lines 402 are used to create the downsampled scan lines 412 in FIG. 4c which is displayed to the physician or user of the device. Data from the other scan lines 402 n=5-16 in FIG. 4b are not displayed to the physician. Sampled values from scan line 402 n=1 in FIG. 4b become duplicated for downsampled scan lines 412 n=1-4 in FIG. 4c. Scan line 402 n=2 in FIG. 4b becomes duplicated for downsampled scan lines 412 n=5-8 in FIG. 4c, and so on. To more clearly show the effect of the process on a limited piece of subject matter 404, FIGS. 4b and 4c used clear boxes 408 and cross-hatched boxes 406 to represent the sampled data points for the scan lines 402, where cross-hatched boxes 406 delineate samples where the subject matter 404 was found and sampled and clear boxes 408 delineate samples where the subject matter was not found. The vertically striped boxes 410 of FIG. 4c illustrate the duplicated sampled data points for the subject matter 404, which are duplications of the cross-hatched boxes 406 onto subsequence downsampled scan lines 412. This illustration is for convenience of illustrating only. In actual practice, all of the boxes that represent sample data points would normally have some value indicating the returned illumination from the scanned target subject matter 101. However, it is still useful for showing the process, because as one can see in FIG. 4c, artifacts that otherwise would have been caused by scanning moving subject matter 404 can eliminated. For example, the ghost image 405 at n=13-16 in FIG. 4b that otherwise would have been scanned and displayed, is not displayed due to the downsampling method as shown in FIG. 4c.

One should note that this resolution reduction process is lossy, as information in the later scan lines 402 is discarded, but it does have the benefit that it is relatively straightforward to implement and is not computationally intensive. This method is especially applicable to those embodiments of the invention where motion is detected using a simple accelerometer as the motion detector 204 or where the motion detection means 204 provides a motion magnitude as opposed to a vector which would provide both direction and magnitude and allow for more complex reconstruction algorithms as detailed later in the application.

A similar process can be used to drop the resolution by a smaller percentage. For example, to drop the resolution by 33% every other scan line 402 is repeated; scan line 402 n=1 becomes downsampled scan lines 412 n=1 and n=2, scan line 402 n=2 becomes downsampled scan lines 412 n=3, scan line 402 n=3 becomes downsampled scan lines 412 n=4 and n=5, etc. Simple experimentation and trial and error can be utilized to determine what pattern of scan line dropping results in a comfortable image for the user, as each type of SBI device can have somewhat different scanning characteristics, and each display device may have different characteristics. In an alternate embodiment, one or more lines can be averaged together, instead of merely repeated, using a weighting function, interpolation, convolving or any other technique as would be known in the art to make the repeated lines.

Modes of Reducing Resolution

In one embodiment, as the SBI controller with motion artifact removal image processor 202 detects motion, the resolution is decreased proportionally as the detected motion increases. By proportionally, this is to meant to include both a linear relationship as well as any non-linear function, for instance a quadratic or higher order equation. It is possible for the detected motion to be at a threshold where the system would change the resolution back and forth between different resolutions. This can be visually unpleasant to the user. The relationship may have hysteresis built into the algorithm so as to prevent rapid bouncing between different resolutions. For example there may be a slightly higher threshold amount of movement necessary to trigger a decrease in resolution than the amount necessary to trigger a subsequent re-increase in resolution. The exact relationship may be best determined by experimentation for the combination of scanner and display.

In another embodiment, as the detected motion exceeds one or more threshold values, the resolution is decreased in a step fashion. As the detected motion decreased below certain threshold values, the resolution is re-increased. As is common practice with step-type functions, the threshold values of motion necessary to trigger a decrease in resolution will be higher than for subsequently re-increasing resolution. This use of different values is commonly known as hysteresis and is used to prevent rapid changing back and forth between two different resolutions when the motion value is near a threshold value. Reducing the resolution in steps is meant to include both situation where hysteresis is employed and where no hysteresis is necessary.

Motion Artifact Removal by Scan Line Reconstruction

In another embodiment, the SBI controller with motion artifact removal image processor 202 develops a vector 502 having both a magnitude and direction to describe the motion of the subject matter 404 relative to the scanner 124. In one embodiment the vector 502 can be a single value for the entire scanned frame and all scan lines 402. In another embodiment, the vector 502 can be a value associated with each scanned line 402 for all the scanned data points in each line 402. In yet another embodiment, the vector 502 can be a characterization of the instantaneous motion of scanner 124 relative to the target subject matter 101 that will approximate the curvilinear path 403 of the subject matter for all sampled data points in a scanned frame. In this embodiment, the motion of each individual data point can be individually calculated from the vector 502. In any of these embodiments, the Motion Artifact Removal Image Processor 206 can perform a smoothing algorithm to the vector(s) 502 to reduce noise or other unwanted rapid transitions.

Figure 5:
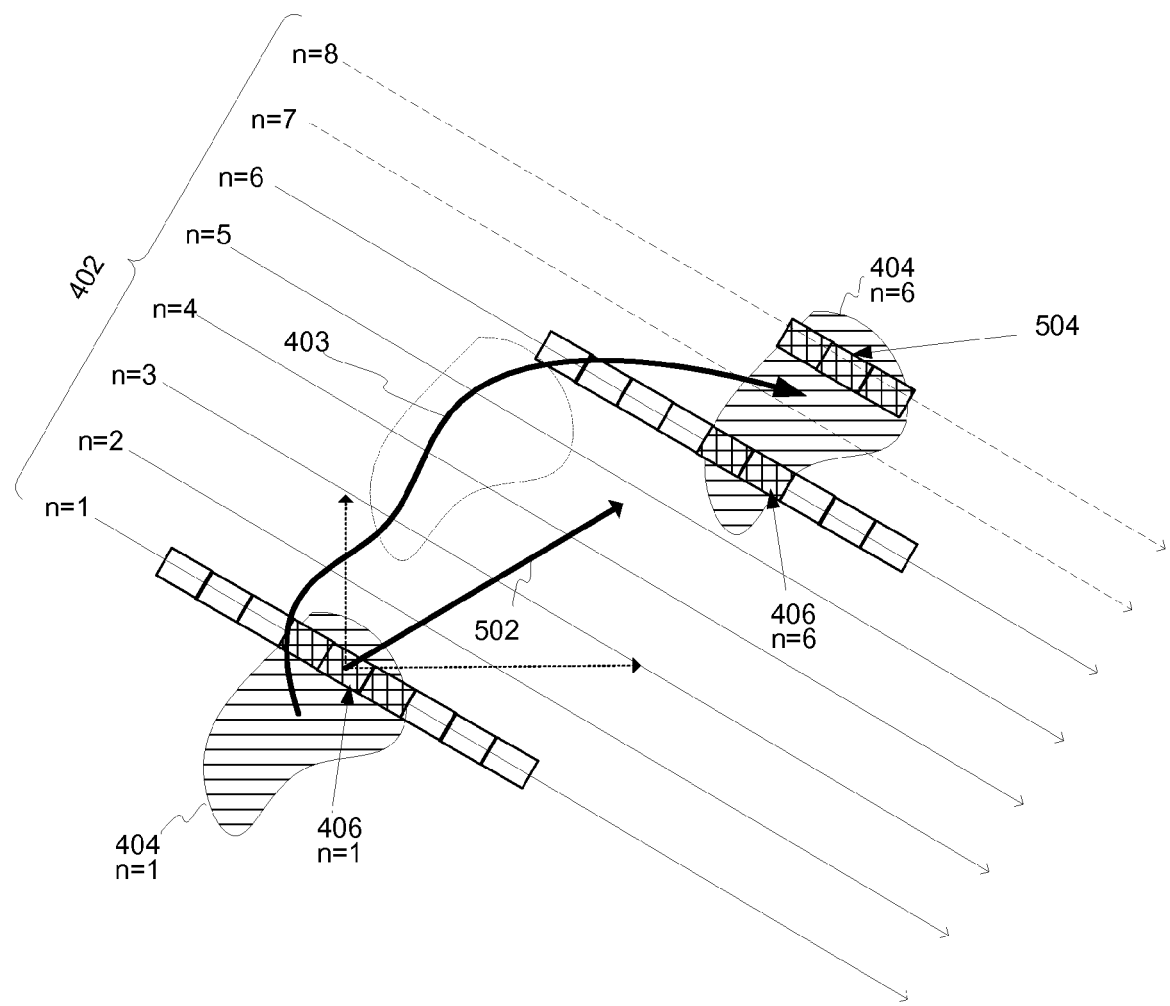
FIG. 5 is an exemplary illustration of one embodiment of the motion artifact removal algorithm where scanned data points are translated to new scan lines or coordinates in response to the detected motion.

Referring now to FIG. 5, the SBI controller with motion artifact removal image processor 202 uses the vector 502 to remap each sampled data point 406 of the subject matter 404 in the SBI image data stream back to the correct position relative to the other data samples where it would have been sampled had it been sampled concurrently with a reference data point in one of the scan lines 402. The current sample data point or scan line 402 can be used, requiring all previously scan lines to be translated by the current instantaneous vector 502, or any data point or scan line 402 can be used as the reference data point. In one embodiment, the reference data point is the first data point of the first scan line 402.

For illustration, the scan line 402 n=6 is chosen as the reference. Even though the moving subject matter 404 traveled in a curvilinear path 403, its net movement can be approximated by the vector 502 which, for illustration purposes, is not shown to scale. Sampled data points 406 are then translated in accordance to the vector 502 to become translated scan points 504. Note that this method moves subject matter 404 to where it would have been had it been sampled contemporaneously with the current scan line 402. In this instance it appears to have jumped forward in time to scan line 402 n=8 which has not yet been sampled. When scan line 402 is finally sampled, their values can be overwritten, averaged, weighted or any other combining method as would be known in the art. A similar function is performed when the translated scan points 504 would overwrite existing data.

Motion translation works by recognizing that any scan line 402 can be translated to the appropriate position relative to another scan line 402 to compensate for motion. Although the process is not generally lossy, one can visualize that because of interaction between the motion of the subject matter 404 at n=1 and n=6 and the scanning process itself, some data points in the subject matter 404 will be scanned more than once, whereas some points may not be scanned at all. Those SBI data stream points that have not been scanned can be repeated from previous data streams, or created from nearby points using a weighting function, interpolation, convolving or any other technique as would be known in the art to create missing data samples. Using a Lissajous to Lissajous weighting circle as described for FIG. 3b can also help to smooth out the data as it is translated to new positions. Generally, the larger the value of the vector 502, the more desirable it would be to have the weighting function spread the distribution of the translated scan point 504 values to additional surrounding data points. This is because large movements of the subject matter 404 will generally result in more overlap of translated data points during scanning and also gaps of missing data scan lines.

Reconstruction Modes

In one embodiment the SBI controller with motion artifact removal image processor 202 works directly with the SBI data stream, preferably creating a new SBI data stream and mapping the data points from each of the scan lines 402 one by one into the new SBI data stream. In another embodiment the SBI system with a motion artifact removal image processor and Lissajous to Cartesian converter 208 first rasterizes the SBI imaged data into a Cartesian-oriented frame having dimensions of x by y with a pixel depth of z, where x, y, and z are chosen to be large enough to provide sufficient resolution for the display device and for other post-processing. The SBI controller with motion artifact removal image processor 202 maps each the data point from each of the scan lines 402 one by one into the Cartesian-oriented frame, and uses this frame to generate a new SBI data stream for an SBI display or output the Cartesian-oriented frame to an FPA display.

SBI System with Motion Artifact Removal Image Processor

The SBI controller with motion artifact removal image processor 202 in the SBI systems 200, 208 is implemented using one or more microcontroller processors (which may be independently applied or embedded in an ASIC or FPGA), and may also include one or more discrete electronic support chips. The actual circuit implementation necessary to perform the digital signal processing necessary for post processing, data mapping and other pixel manipulation processes could be done in a variety of ways that would be obvious to one of ordinary skill in the art.

CONCLUSION

The numerous embodiments described above are applicable to a number of different applications. One particular application where the Motion Artifact Removal Processor is especially applicable is in eliminating tearing and other motion artifacts that occur when a user moves an SBI endoscope appreciably during imaging, however there are many additional applications that would be apparent to one of ordinary skill in the art.

The embodiments of the invention shown in the drawings and described above are exemplary of numerous embodiments that may be made within the scope of the appended claims. It is contemplated that numerous other configurations of the disclosed system, process, and devices for removing motion artifacts may be created taking advantage of the disclosed approach. It is the applicant's intention that the scope of the patent issuing herefrom will be limited only by the scope of the appended claims.

What is claimed is:

1. A system for removing motion artifacts from image data comprising:
    an SBI device adapted for delivering an SBI formatted image data stream of a subject matter being imaged, said SBI device further comprising an illuminating-scanning portion and a detecting portion;
    a motion detection means, said motion detection means being operably adapted to detect a motion of said illuminating-scanning portion relative to said subject matter being imaged and output a motion data; and
    a processor adapted for accepting said SBI formatted image data stream and said motion data, processing said SBI formatted image data stream using said motion data to remove the motion artifacts, said processing changing the resolution by eliminating a first plurality of scanned lines in the SBI formatted image data stream from a field of view and replacing said first plurality of scanned lines using data derived at least in part from a remaining second plurality of scanned lines to produce a motion corrected data stream, and outputting said motion corrected image data stream.

2. The system of claim 1 wherein said change to the resolution is selected from the group consisting of: a) a reduction in the resolution in proportion to an increase in said motion detected by said motion detection means; and b) a reduction in the resolution in one or more steps based upon a threshold of motion being detected by said motion detection means.

3. The system of claim 1 wherein said processing by said processor further comprises translating each data point of said SBI formatted image data stream to a corrected position based on at least one of a plurality of motions detected within a frame by said motion detection means, and thereafter reconstructing said motion corrected image data stream.

4. The system of claim 3 wherein said corrected position corresponds to a plurality of corrected data points determined by a weighting function based on at least one of said plurality of motions, and wherein said plurality of motions occur within a frame between said data points.

5. The system of claim 4 wherein said weighting function is correlated to said motion.

6. The system of claim 4 wherein said plurality of corrected data points are pixels in a Cartesian frame and wherein said motion corrected image data stream is a Cartesian display compatible data stream.

7. The system of claim 6 wherein said Cartesian frame is sized sufficiently to allow substantially lossless translation between said SBI formatted image data stream and said Cartesian frame.

8. The system of claim 1 wherein said motion detection means comprises an accelerometer, said accelerometer being operably connected to said illuminating-scanning portion.

9. The system of claim 8 wherein said accelerometer is a set of solid-state MEMS accelerometers, said MEMS accelerometers being operably connected to said illuminating-scanning portion.

10. The system of claim 8 wherein said accelerometer is two or more sets of solid-state MEMS accelerometers, said MEMS accelerometers being operably connected to said illuminating-scanning portion at different locations.

11. The system of claim 1 wherein said motion detection means is an algorithm running in said processor.

12. The system of claim 1 wherein said motion detection means comprises an algorithm and an accelerometer.

13. An apparatus for removing motion artifacts from video, comprising:
    a video source input, said video source input providing a video stream of an imaged subject matter from an SBI imaging device;
    a motion detector, said motion detector being adapted to detect the motion of said SBI imaging device relative to said imaged subject matter and output a vector describing said motion; and
    a processor, said processor being operably connected to said motion detector, and said processor decreasing the resolution of said video stream in relation to the detection of said motion by eliminating a first plurality of lines in said video stream and replacing said first plurality of lines using data derived at least in part from a remaining second plurality of lines in said video stream to remove the motion artifact from said video stream.

14. The apparatus of claim 13 wherein the operation of decreasing the resolution is selected from the group consisting of: a) proportionally decreasing the resolution relative to an increasing of motion detected; and b) decreasing the resolution in steps dependent upon a threshold motion detected.

15. The apparatus of claim 13 wherein said processor is further adapted to remove the motion artifacts by translating each data point in said video stream to a corrected position based on said vector describing the motion detected by said motion detector.

16. The system of claim 15 wherein said corrected position corresponds to a plurality of corrected data points determined by a weighting function, and wherein said motion detected is a plurality of vectors occurring within a frame between said data points, and wherein said weighting function is based on at least one of said plurality of vectors.

17. The system of claim 16 wherein said weighting function is correlated to said vector.

18. The system of claim 16 wherein said plurality of corrected data points are pixels in a Cartesian frame and further comprising an outputted Cartesian display compatible video stream derived from said Cartesian frame.

19. The system of claim 18 wherein said Cartesian frame is sized sufficiently to allow substantially lossless translation between said each data point in said video stream and said Cartesian frame.

20. The apparatus of claim 13 wherein said motion detector comprises an accelerometer, said accelerometer being operably attached to said SBI imaging device.

21. The apparatus of claim 20 wherein said accelerometer is a set of solid-state MEMS accelerometers.

22. The apparatus of claim 20 wherein said accelerometer is two or more sets of solid-state MEMS accelerometers, said MEMS accelerometers being operably attached to said SBI imaging device at different locations on said SBI imaging device.

23. The apparatus of claim 13 wherein said motion detector is an algorithm running in said processor.

24. A method of removing motion artifacts from an image, said method comprising:
   a) acquiring the image from a video source, said video source having acquired the image from an SBI imaging device;
   b) acquiring motion data from a motion detector, said motion data being correlated temporally with the image, and said motion data describing the motion of said SBI imaging device during said acquiring of the image from said SBI imaging device;
   c) selectively reducing the resolution of the image based on said motion data from said motion detector to create a motion corrected image, said operation of selectively reducing the resolution of the image performed by decreasing the resolution of the image in relation to said motion data by eliminating a first plurality of lines in the image and replacing said first plurality of lines using data derived at least in part from a remaining second plurality of lines in the image to remove the motion artifacts from the image; and
   d) outputting said motion corrected image.

25. The method of claim 24, wherein the operation of selectively reducing the resolution is selected from the group consisting of: i) proportionally reducing the resolution in proportion to said motion data; and ii) reducing the resolution in steps as said motion data exceeds threshold values.

26. The method of claim 24, wherein said motion detector is operably connected to said SBI imaging device, said motion data is a vector describing the motion of said SBI imaging device, and c) further comprises:
   c) translating each data point of the image based on said vector to reconstruct a motion corrected image.

* * * * *